(12) United States Patent
Sakai et al.

(10) Patent No.: US 8,929,371 B2
(45) Date of Patent: Jan. 6, 2015

(54) OPTICAL TRANSMISSION DEVICE, SCRAMBLING METHOD, AND DESCRAMBLING METHOD

(71) Applicant: Fujitsu Limited, Kawasaki (JP)

(72) Inventors: Yoshio Sakai, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 13/667,661

(22) Filed: Nov. 2, 2012

(65) Prior Publication Data

US 2013/0058656 A1  Mar. 7, 2013

Related U.S. Application Data

(62) Division of application No. 12/081,220, filed on Apr. 11, 2008, now Pat. No. 8,331,402.

(30) Foreign Application Priority Data

Apr. 12, 2007  (JP) .................................. 2007-105241

(51) Int. Cl.
  *H04J 3/16*   (2006.01)
(52) U.S. Cl.
  CPC ............. *H04J 3/1694* (2013.01); *H04J 3/1658* (2013.01)
  USPC ....................................................... 370/391
(58) Field of Classification Search
  USPC ......... 370/389, 391, 395.1, 395.51, 474, 475, 370/538; 398/154–156
  See application file for complete search history.

(56) References Cited

U.S. PATENT DOCUMENTS

| | | | |
|---|---|---|---|
| 5,278,689 A * | 1/1994 | Gitlin et al. | ..................... 398/54 |
| 5,327,421 A | 7/1994 | Hiller et al. | |
| 5,541,926 A | 7/1996 | Saito et al. | |
| 5,787,255 A | 7/1998 | Parlan et al. | |
| 5,841,771 A | 11/1998 | Irwin et al. | |
| 6,167,041 A | 12/2000 | Afanador | |
| 7,191,249 B1 | 3/2007 | Lacroute et al. | |

(Continued)

FOREIGN PATENT DOCUMENTS

| | | |
|---|---|---|
| JP | 9-214541 | 8/1997 |
| JP | 2000-188593 | 7/2000 |
| JP | 2007-019797 | 1/2007 |
| WO | 2005/096574 | 10/2005 |

OTHER PUBLICATIONS

ITU, ITU-T Rec. G.894.3, Oct. 27, 2005, ITU-T, 30 pages.

*Primary Examiner* — Hoon J Chung
(74) *Attorney, Agent, or Firm* — Staas & Halsey LLP

(57) ABSTRACT

A first header-attaching unit attaches to data of a low speed bit rate A, a header of the bit rate A. A second header-attaching unit attaches the header of the bit rate A to data of a high speed bit rate B. A combining unit combines outputs of the first and the second header-attaching units. A low speed scrambling unit performs a scrambling process on combined data by using a clock corresponding to the bit rate A. A high speed scrambling unit performs a scrambling process on the data of the bit rate B by using a clock corresponding to the bit rate B. During a timing corresponding to the bit rate A in the frame, a selector selects an output of the low speed scrambling unit. During a timing corresponding to the bit rate B in the frame, the selector selects an output of the high speed scrambling unit.

5 Claims, 16 Drawing Sheets

(56) References Cited

U.S. PATENT DOCUMENTS

| | | |
|---|---|---|
| 7,899,329 B2 | 3/2011 | Yamabana |
| 2001/0004354 A1 | 6/2001 | Jolitz |
| 2004/0202470 A1 | 10/2004 | Lim et al. |
| 2006/0120365 A1 | 6/2006 | Nishihara |
| 2006/0133809 A1 | 6/2006 | Chow et al. |
| 2007/0058974 A1 | 3/2007 | Krimmel |
| 2007/0070997 A1 | 3/2007 | Weitz et al. |
| 2007/0230471 A1 | 10/2007 | Ikeda et al. |
| 2008/0187317 A1 | 8/2008 | Yamabana |
| 2009/0010650 A1 | 1/2009 | Tsuchiya et al. |
| 2009/0034964 A1 | 2/2009 | Sakai et al. |
| 2009/0202242 A1 | 8/2009 | Niibe et al. |
| 2009/0208207 A1 | 8/2009 | Suvakovic |
| 2009/0210553 A1 | 8/2009 | Takase et al. |

\* cited by examiner

FIG.5
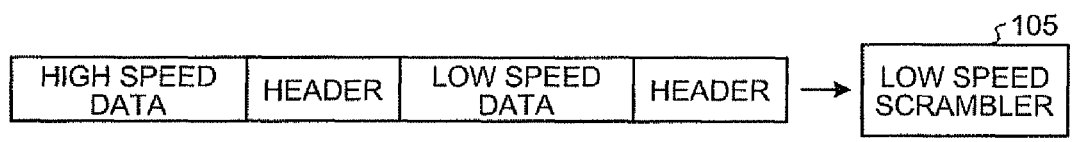
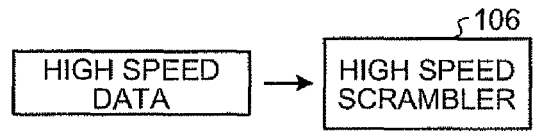

FIG.10
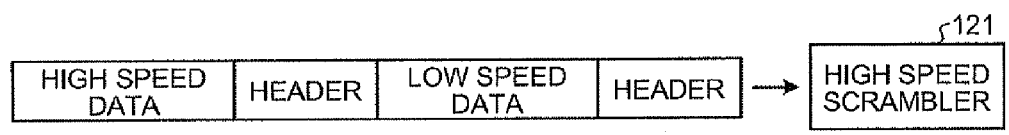

OPTICAL TRANSMISSION DEVICE, SCRAMBLING METHOD, AND DESCRAMBLING METHOD

CROSS REFERENCE TO RELATED APPLICATIONS

This application is a divisional application of U.S. Ser. No. 12/081,220, filed on Apr. 11, 2008 which is based on and hereby claims priority to Japanese Application No. 2007-105241 filed on Apr. 12, 2007, the contents of which are hereby incorporated by reference.

BACKGROUND OF THE INVENTION

1. Field of the Invention

The present invention relates to an optical transmission device, a scrambling method, and a descrambling method, and, more particularly to an optical transmission device, a scrambling method, and a descrambling method that enable to mix and transmit signals of different bit rates at a low cost.

2. Description of the Related Art

In recent years, attention is being focused on optical transmission systems using optical fibers as a communication system having the potential for large volumes of data at high speed. In an optical transmission system, an optical line terminal (OLT) serving as a host station device and a plurality of optical network units (ONUs) functioning as subscriber devices are connected by optical fibers.

In an optical transmission system, which is generally called a passive optical network (PON), various studies are being performed for further increasing transmission capacity. For example, in a technology disclosed in Japanese Patent Application Laid-open No. H9-214541, a provider device includes framers that correspond to a plurality of ONUs and the respective framers transmit frames of different transmission speeds to the ONU. The technology mentioned earlier enables to individually set bit rates of the frames that are transmitted to each ONU and enables to connect a single provider device with the multiple ONU of different transmission capacities. Due to this, in the optical transmission system, the transmission capacity can be gradually increased while enhancing performance of a portion of the ONU.

However, in the technology mentioned earlier, the multiple independent framers are included in the single provider device, thus significantly increasing the cost. Further, the technology mentioned earlier presupposes a single star (SS) type as a network topology. Due to this, an existing network form needs to be significantly changed, thus increasing the cost.

In a method for gradually increasing the transmission capacity at a low cost, speeds of the bit rates in data of the frames are increased and speeds of the bit rates in a header of the frames are matched to the bit rate of the lowest speed. In other words, in the frame which is addressed to the ONU of a high transmission capacity, causing the bit rates in the header and in the data to differ and increasing a capacity of the data enables to increase the transmission capacity. Further, for all the frames, because the bit rates in the header are equal to the bit rate of the lowest speed, all the ONU can check contents of the frame in common and all the ONU can determine from the header whether the data is addressed to the respective ONU itself.

Thus, the bit rate in the header of the frame is common to all the ONU and the bit rates in the data of the frame vary according to the respective ONU. Due to this, the provider device in the form of an optical line terminal (OLT) transmits the frame in which a plurality of the bit rates are mixed. A method needs to be devised to perform a scrambling process on the frame of the mixed bit rates. However, the scrambling process on the frame of the mixed bit rates has not been studied yet.

SUMMARY OF THE INVENTION

It is an object of the present invention to at least partially solve the problems in the conventional technology.

According to an aspect of the present invention, an optical transmission device that transmits data to a plurality of destination addresses, includes a first attaching unit that attaches a header of a first bit rate to data of the first bit rate, the header of the first bit rate including identification data for identifying a destination address of the data of the first bit rate; a second attaching unit that attaches the header of the first bit rate to data of a second bit rate greater than the first bit rate, the header of the first bit rate including identification data for identifying a destination address of the data of the second bit rate; a first scrambling unit that performs a scrambling process, by using a clock corresponding to the first bit rate, on signals that are obtained by the first attaching unit and the second attaching unit; a second scrambling unit that performs a scrambling process, by using a clock corresponding to the second bit rate, on the data of the second bit rate in the second attaching unit; and a transmitting unit that transmits the signals obtained due to the scrambling process by the first scrambling unit or the second scrambling unit.

According to another aspect of the present invention, an optical transmission device that transmits data to a plurality of destination addresses, includes a first attaching unit that attaches a header of a first bit rate to data of the first bit rate, the header of the first bit rate including identification data for identifying a destination address of the data of the first bit rate; a second attaching unit that attaches the header of the first bit rate to data of a second bit rate greater than the first bit rate, the header of the first bit rate including the identification data for identifying the destination address of the data of the second bit rate; a combining unit that combines signals that are obtained by the first attaching unit and the second attaching unit to obtain combined data; a scrambling unit that performs a scrambling process, by using a clock corresponding to the first bit rate, on the combined data obtained by the combining unit; and a transmitting unit that transmits a signal obtained due to the scrambling process by the scrambling unit.

According to still another aspect of the present invention, an optical transmission device that receives a signal including therein data of different bit rates, the optical transmission device includes a retrieving unit that retrieves a clock signal from the received signal; a frequency dividing unit that divides the clock signal retrieved by the retrieving unit to obtain a low clock signal corresponding to the minimum bit rate among the bit rates of the data; a first descrambling unit that uses the low clock signal obtained by the frequency dividing unit and performs a descrambling process on a header of the minimum bit rate included in the received signal; and a second descrambling unit that specifies a position, in the received signal, of data that is addressed to the optical transmission device itself, by referring to the header that is subjected to the descrambling process by the first descrambling unit, and uses the clock signal retrieved by the retrieving unit to perform the descrambling process on the data that is addressed to the optical transmission device itself.

According to still another aspect of the present invention, a scrambling method is for an optical transmission device that transmits data to a plurality of destination addresses. The scrambling method includes attaching a header of a first bit rate to data of the first bit rate, the header of the first bit rate including identification data for identifying a destination address of the data of the first bit rate; attaching the header of the first bit rate to data of a second bit rate greater than the first bit rate, the header of the first bit rate including identification data for identifying a destination address of the data of the second bit rate; performing a scrambling process, by using a clock that corresponds to the first bit rate, on signals that are obtained by the attaching to the data of the first and the second bit rate; performing a scrambling process, by using a clock corresponding to the second bit rate, on the data of the second bit rate in the attaching to the data of the second bit rate; and transmitting the signals obtained due to the scrambling process for the first or the second bit rate.

According to still another aspect of the present invention, a scrambling method is for an optical transmission device that transmits data to a plurality of destination addresses. The scrambling method includes attaching a header of a first bit rate to data of a first bit rate, the header of the first bit rate including identification data for identifying a destination address of the data of the first bit rate; attaching the header of the first bit rate to data of a second bit rate greater than the first bit rate, the header of the first bit rate including the identification data for identifying the destination address of the data of the second bit rate; combining signals that are obtained by the attaching to the data of the first and the second bit rates to obtain combined data; performing a scrambling process, by using a clock corresponding to the first bit rate, on the combined data; and transmitting a signal obtained due to the scrambling process.

According to still another aspect of the present invention, a descrambling method is for an optical transmission device that receives a signal including therein data of different bit rates. The descrambling method includes retrieving a clock signal from the received signal; dividing the clock signal retrieved by the retrieving to obtain a low clock signal corresponding to the minimum bit rate among the bit rates of the data; performing, by using the low clock signal obtained by the dividing, a descrambling process on a header of the minimum bit rate included in the received signal; specifying a position, in the received signal, of data that is addressed to the optical transmission device itself, by referring to the header that is subjected to the descrambling process; and performing, by using the clock signal retrieved by the retrieving, the descrambling process on the data that is addressed to the optical transmission device itself.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining a scrambling process according to the first embodiment;

FIG. 10 is a schematic for explaining a scrambling process according to the second embodiment;

DETAILED DESCRIPTION OF THE PREFERRED EMBODIMENTS

According to a salient feature of the present invention, a header which includes a bit rate of a minimum speed is commonly attached to and combined with a plurality of data that include different bit rates. Next, the resulting combined data is subjected to a scrambling process that corresponds to the bit rates of signals. Exemplary embodiments of the present invention are explained below with reference to the accompanying drawings.

Figure 1:
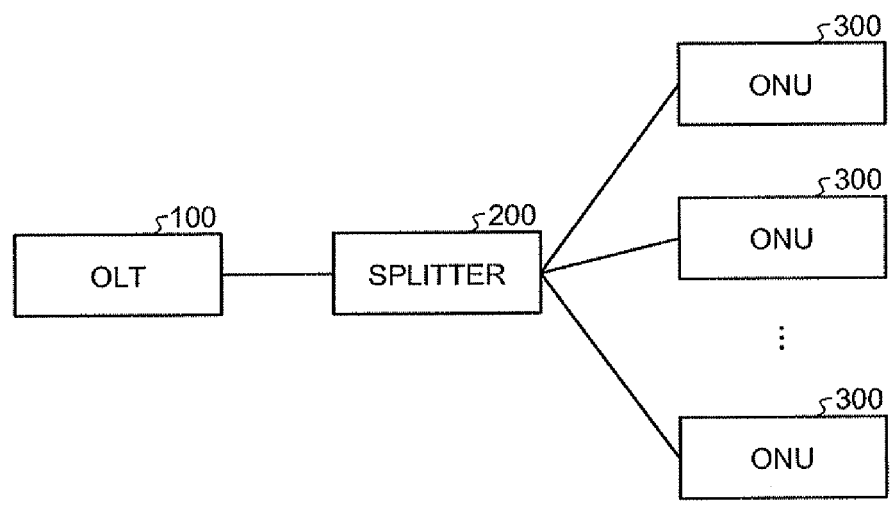
FIG. 1 is a block diagram of an optical transmitting system according to a first embodiment of the present invention.

FIG. 1 is a schematic diagram of an optical transmission system according to a first embodiment of the present invention. In the optical transmission system according to the first embodiment, an optical line terminal (OLT) 100 serving as a host station device is connected via a splitter 200 to a plurality of optical network units (ONUs) 300 functioning as subscriber devices.

The OLT 100 transmits signals over optical fibers to the ONUs 300 by time division multiplexing. The OLT 100 attaches a header of the same bit rate to all pieces of data and transmits each set of data and its header as one transmission unit. The header attached to the data contains the least bit rate from among all the bit rates of the data to be transmitted. The header also contains information concerning the ID of the destination ONU 300 and a position of the data among the transmission units.

The splitter 200 splits the optical fiber from the OLT 100 to connect the OLT 100 to each of the ONUs 300. Thus, signals transmitted over the optical fiber from the OLT 100 are transmitted to all the ONUs 300 via the splitter 200.

The ONUs 300 receive signals via optical fibers and retrieve data from a transmission unit in which identification data of the respective ONUs 300 itself is stored. All the ONUs 300 shown in FIG. 1 do not include entirely the same functions and the bit rates of the signals that are receivable by the respective ONUs 300 can also differ. However, in the example explained below, for the sake of simplicity, the ONUs 300 which correspond to a low speed bit rate A and a high speed bit rate B are mixed.

Figure 2:
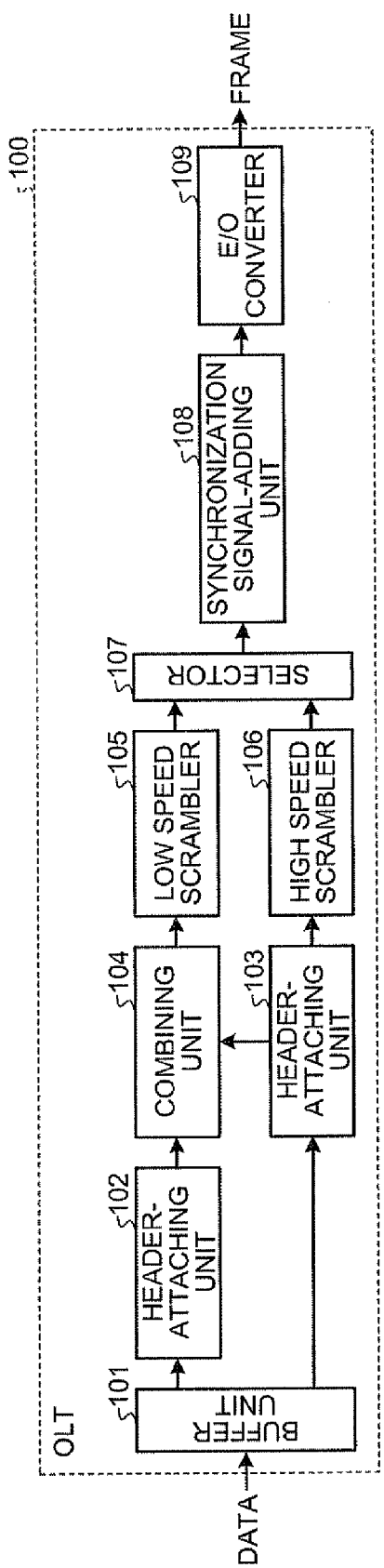
FIG. 2 is a block diagram of an OLT according to the first embodiment.

FIG. 2 is a block diagram of an optical line network (OLT) 100 according to a first embodiment of the present invention. As shown in FIG. 2, the OLT 100 includes a buffer unit 101, header-attaching units 102 and 103, a combining unit 104, a low speed scrambler 105, a high speed scrambler 106, a selector 107, a synchronization signal-adding unit 108, and an electrical/optical (E/O) converter 109.

The buffer unit 101 temporarily holds the data to be transmitted to the ONUs 300. The buffer unit 101 holds data to be transmitted to the ONUs 300 receiving data at bit rate A as well as bit rate B. In other words, the buffer unit 101 stores data of both bit rates A and B.

The header-attaching unit 102 attaches a header of the bit rate A to the data of the low speed bit rate A, from data that is stored in the buffer unit 101, to generate a transmission unit. The header includes identification data of the destination ONU 300 and position data of the data in the transmission unit. Further, the header-attaching unit 102 attaches to the transmission unit, a frame header related to a frame that includes a single transmission unit or a plurality of transmission units. The frame header includes frame data such as the position data of each transmission unit in the frame.

The header-attaching unit 103 attaches the header of the bit rate A to the data of the high speed bit rate B, among data that is stored in the buffer unit 101, to generate a transmission unit. The header includes the identification data of the destination ONU 300 and the position data of the data in the transmission unit. Further, the header-attaching unit 103 outputs to the combining unit 104, the transmission unit that includes the attached header and outputs to the high speed scrambler 106, only the data of the bit rate B before a header attachment.

The combining unit 104 combines the transmission unit that is generated by the header-attaching unit 102 and the transmission unit that is generated by the header-attaching unit 103. Next, the combining unit 104 outputs the combined data that is obtained to the low speed scrambler 105. In other words, the combining unit 104 outputs to the low speed scrambler 105, the combined data in which the data and the header of the low speed bit rate A and the data of the high speed bit rate B are mixed.

The low speed scrambler 105 performs the scrambling process on the combined data by using a clock that corresponds to the low speed bit rate A. In other words, the low speed scrambler 105 calculates exclusive-OR of each bit of the combined data and a scrambling bit that changes for each clock corresponding to the low speed bit rate A to obtain scramble data.

The high speed scrambler 106 performs the scrambling process on the data of the high speed bit rate B by using a clock that corresponds to the bit rate B. In other words, the high speed scrambler 106 calculates exclusive-OR of each bit of the data of the bit rate B and a scrambling bit that changes for each clock corresponding to the high speed bit rate B to obtain scramble data.

Figure 3:
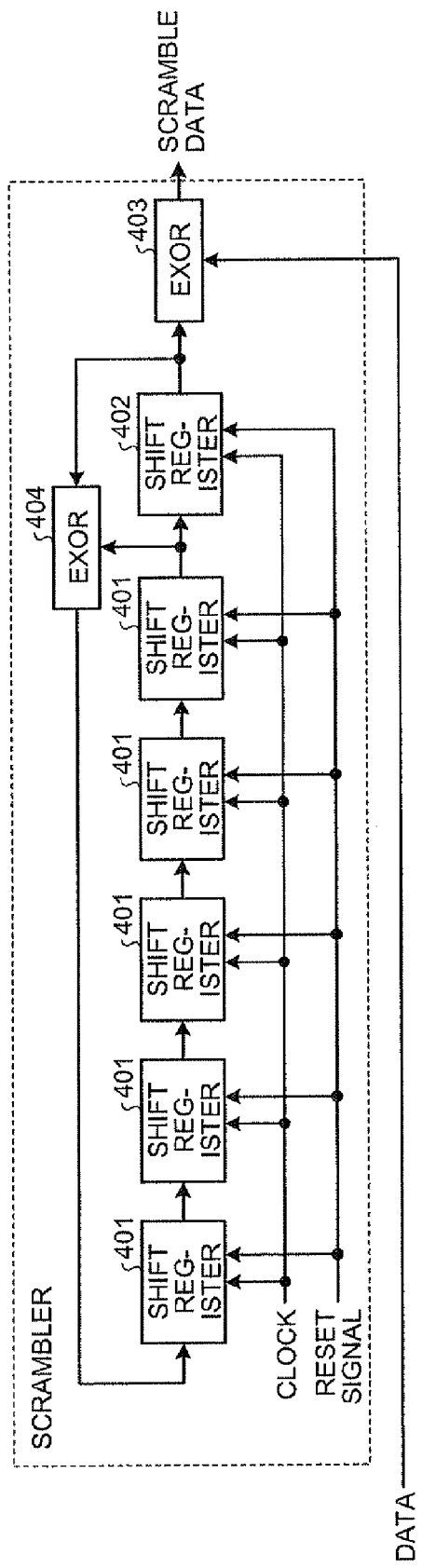
FIG. 3 is a block diagram of a scrambler according to the first embodiment.

A structure of a scrambler according to the first embodiment is explained with reference to FIG. 3. The low speed scrambler 105 and the high speed scrambler 106 according to the first embodiment include the structure that is shown in FIG. 3. The scrambler includes a plurality of shift registers 401, an end shift register 402, and EXOR circuits 403 and 404.

The shift registers 401 store therein values "0" or "1" of a single bit and output, during a cycle that is notified by the clock, to the adjacent shift register 401 or to the end shift register 402, the stored value of the single bit. Further, the shift registers 401 are initialized by reset signals that are input at a timing in a beginning of the frame and store therein "1" during an initial status.

The end shift register 402 stores therein values "0" or "1" of a single bit and outputs, during a cycle that is notified by the clock, to the EXOR circuits 403 and 404, the stored value of the single bit. Further, the end shift register 402 is initialized by the reset signals that are input at the timing in the beginning of the frame and stores therein "1" during the initial status.

In the low speed scrambler 105 and the high speed scrambler 106 according to the first embodiment, the clocks which are input into the shift registers 401 and into the end shift register 402 are different. To be specific, the clock corresponding to the low speed bit rate A is input into the shift registers 401 and the end shift register 402 of the low speed scrambler 105, and the clock corresponding to the high speed bit rate B is input into the shift registers 401 and the end shift register 402 of the high speed scrambler 106. Due to this, the shift registers 401 and the end shift register 402 output the values of the single bit at different intervals. Thus, the low speed scrambler 105 and the high speed scrambler 106 perform the scrambling process according to the respective data that include the different bit rates.

The EXOR circuit 403 calculates exclusive-OR of the single bit that is output from the end shift register 402 and each bit of the data and sequentially outputs a calculation result as the scramble data. In other words, the EXOR circuit 403 calculates exclusive-OR of the scrambling bit and the bits of the data and sequentially outputs the calculation result as the scramble data. In the first embodiment, the bit rates of the data which is input into the low speed scrambler 105 and the high speed scrambler 106 match with the cycles during which the value of the single bit is output from the end shift register 402. Due to this, the respective bits of the data are subjected to the scrambling process by the corresponding scrambling bit.

The EXOR circuit 404 calculates an exclusive-OR of the bits that are output from the shift register 401 at one end and the bits that are output from the end shift register 402 and outputs a calculation result to the shift register 401 at the other end. Although the scramblers shown in FIG. 3 perform the scrambling process of a generating polynomial $1+x^6+x^7$, a random generating polynomial can also be used. Thus, a number of the shift registers 401 and a position of the EXOR circuit 404 can also differ from the number of the shift registers 401 and the position of the EXOR circuit 404 that are shown in FIG. 3.

Returning to FIG. 2, the selector 107 selects and outputs any one of the output from the low speed scrambler 105 and the output from the high speed scrambler 106. To be specific, the selector 107 selects the output of the low speed scrambler 105 during an output timing of a portion corresponding to the bit rate A in the frame and selects the output of the high speed scrambler 106 during an output timing of a portion corresponding to the bit rate B in the frame. Thus, during a timing corresponding to the frame header, the header of each transmission unit, and the data of the bit rate A, the selector 107 outputs the scramble data that is subjected to the scrambling process by the low speed scrambler 105 and during a timing corresponding to the data of the bit rate B, the selector 107 outputs the scramble data that is subjected to the scrambling process by the high speed scrambler 106.

The synchronization signal-adding unit 108 adds synchronization signals of a predetermined pattern in the beginning of the scramble data that is output from the selector 107. In other words, by adding the synchronization signals in the beginning of the frame header, the synchronization signal-adding unit 108 generates a frame, which includes the frame header that includes the synchronization signals, the transmission unit that includes low speed data, and the transmission unit that includes high speed data.

The E/O converter 109 converts into optical signals, the frame of electric signals that are generated by the synchronization signal-adding unit 108, and transmits the optical signals to the multiple ONU 300 via the optical fibers.

Figure 4:
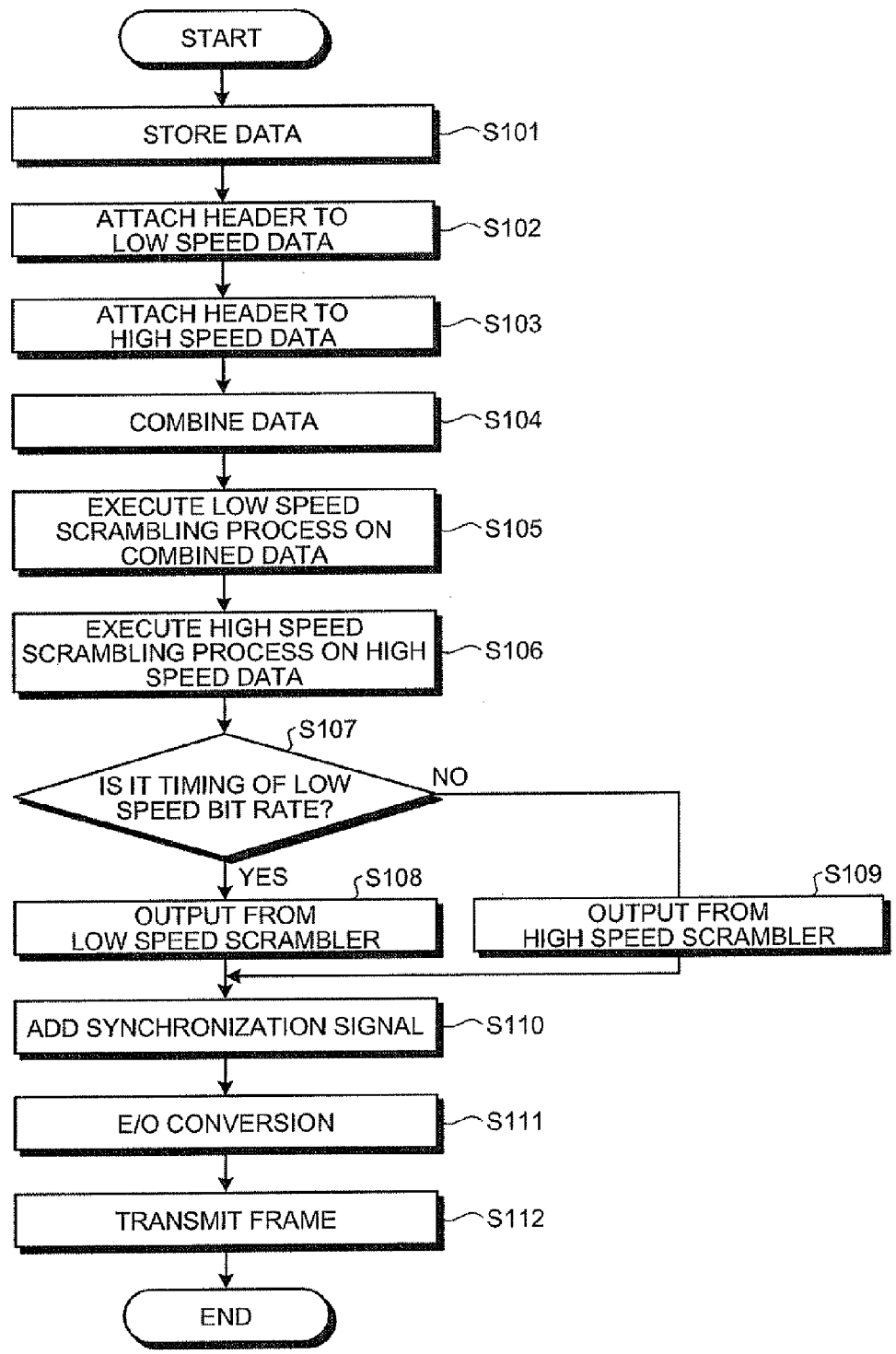
FIG. 4 is a flowchart of an operation of the OLT according to the first embodiment.

FIG. 4 is a flowchart of the processes performed by the OLT 100 according to the first embodiment.

When the OLT 100 receives input of the data to be transmitted to the ONUs 300, and the buffer unit 101 temporarily stores therein the received data (step S101). Next, among the data that is stored in the buffer unit 101, the data of the low speed bit rate A (hereinafter, "low speed data") is output to the header-attaching unit 102 and the data of the high speed bit rate B (hereinafter, "high speed data") is output to the header-attaching unit 103.

When the low speed data is output to the header-attaching unit 102, the header-attaching unit 102 attaches the header of the low speed bit rate A to the low speed data to generate the transmission unit and attaches to the transmission unit, the frame header that includes the frame data of the entire frame (step S102). When the high speed data is output to the header-attaching unit 103, the header-attaching unit 103 attaches the header of the low speed bit rate A to the high speed data to generate the transmission unit (step S103).

When the transmission unit which includes the high speed data that is generated by the header-attaching unit 103 is output to the combining unit 104, only the high speed data without the header is simultaneously output to the high speed scrambler 106. The combining unit 104 combines the transmission unit that includes the low speed data with the transmission unit that includes the high speed data (step S104) and outputs the obtained combined data to the low speed scrambler 105.

Due to this, the combined data is input into the low speed scrambler 105 and the high speed data is input into the high speed scrambler 106. The low speed scrambler 105 performs the scrambling process on the combined data (step S105). Similarly, the high speed scrambler 106 performs the scrambling process on the high speed data (step S106).

In other words, as shown in FIG. 5, the header and the low speed data of the bit rate A and the high speed data of the bit rate B are input into the low speed scrambler 105 and the scrambling process is performed by using the clock corresponding to the bit rate A. Similarly, the high speed data of the bit rate B is input into the high speed scrambler 106 and the scrambling process is performed by using the clock corresponding to the bit rate B. In the first embodiment, because the low speed scrambler 105 performs the scrambling process on the high speed data among the combined data, the bit rate B of the high speed data being an integral multiple of the bit rate A is desirable. Further, although not shown in FIG. 5, the frame header, which stores therein the frame data of the entire frame, is first input into the low speed scrambler 105.

Thus, executing the scrambling process by using the low speed scrambler 105 and the high speed scrambler 106 scrambles the combined data and the high speed data and enables to curb interference between the signals that are being transmitted. Further, although the high speed data is subjected to the scrambling process by both the low speed scrambler 105 and the high speed scrambler 106, the high speed scrambler 106 performs the scrambling process by using the scrambling bit that changes with respect to the respective bits of the high speed data. Thus, for the high speed data, interference curbing effect is greater when the scramble data is transmitted by the high speed scrambler 106.

Due to this, in a predetermined frame structure, the selector 107 determines whether each timing, which enables to position the scramble data in the frame, is the timing for the signals of the low speed bit rate A (step S107). In other words, during the timing for the signals of the frame header, the header of the transmission unit, and the low speed data in the frame, the selector 107 selects and outputs the output from the low speed scrambler 105 (step S108). During the timing for the signals of the high speed data in the frame, the selector 107 selects and outputs the output from the high speed scrambler 106 (step S109).

Next, the synchronization signal-adding unit 108 adds the synchronization signals of the predetermined pattern in the beginning of the output from the selector 107 to generate the frame (step S110). Because the synchronization signals are used at the time of establishing synchronization before a descrambling process in the receiver ONU 300, the synchronization signals are added in the beginning of the frame before performing the scrambling process. The frame thus generated is converted into the optical signals by the E/O converter 109 (step S111) and is transmitted to the multiple ONU 300 via the optical fibers (step S112).

Operation timings of the low speed scrambler 105 and the high speed scrambler 106 according to the first embodiment are specifically explained with reference to FIG. 6.

In the first embodiment, the OLT 100 transmits the frame in which the single or the multiple transmission units are arranged in continuation with the frame header that includes the synchronization signals in the head. It is assumed that the single frame includes the frame header, the transmission unit that includes the low speed data, and the transmission unit that includes the high speed data.

Figure 6:
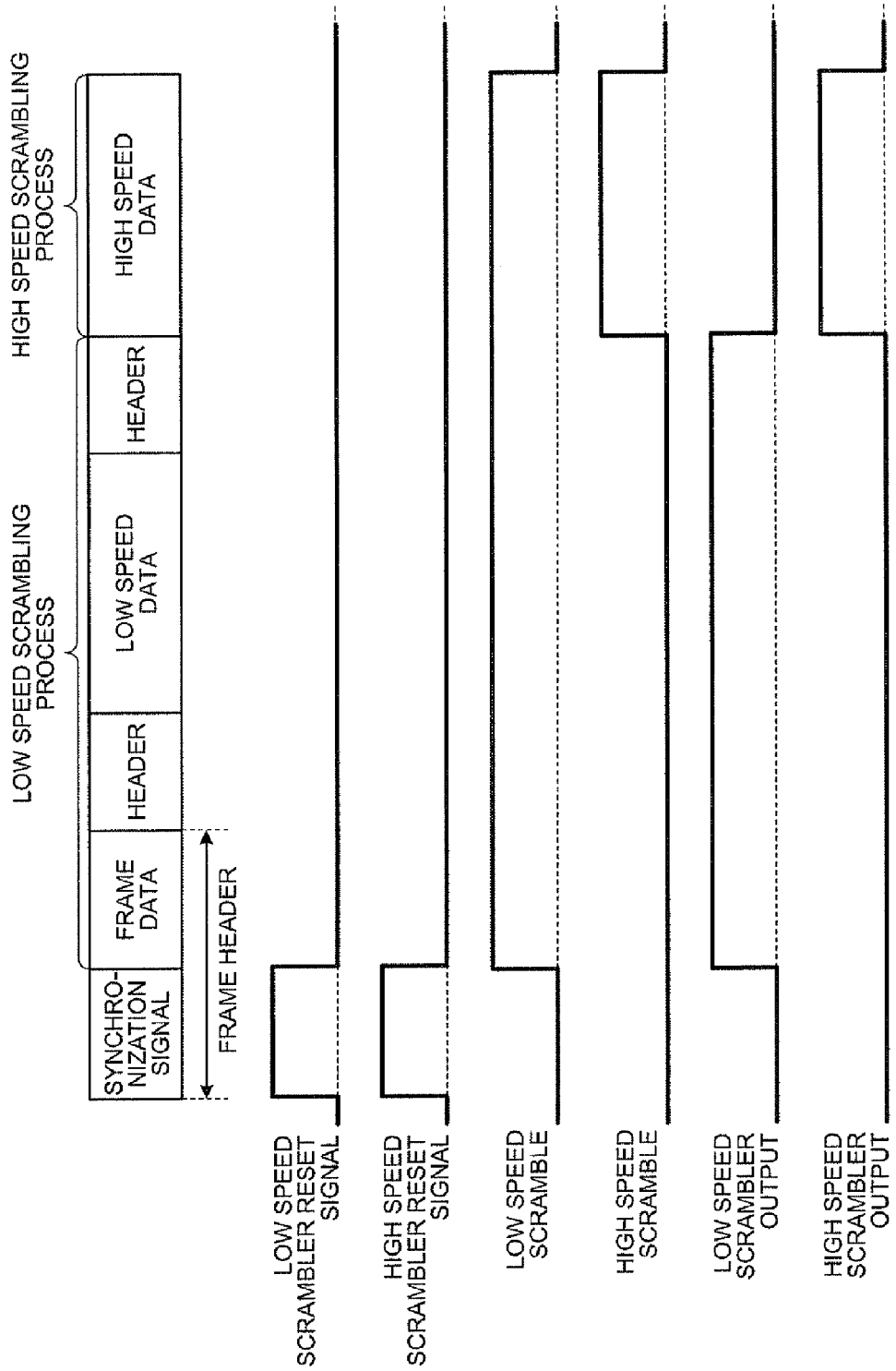
FIG. 6 is a schematic of an operation timing of the scrambler according to the first embodiment.

As shown in FIG. 6, during the timing of the synchronization signals in the beginning of the frame, the reset signals in both the low speed scrambler 105 and the high speed scrambler 106 enter enable status that indicates validity. Due to this, all the shift registers 401 and the end shift register 402 which are shown in FIG. 3 are initialized and store therein "1".

Next, the low speed scrambler 105 enters enable status and performs the scrambling process on the frame data of the bit rate A, the transmission unit that includes the low speed data, and the transmission unit that includes the high speed data by using the clock corresponding to the bit rate A. During the timing of the high speed data in the frame, the high speed scrambler 106 enters enable status and performs the scrambling process on the high speed data of the bit rate B by using the clock corresponding to the bit rate B.

Further, in the selector 107, the output from the low speed scrambler 105 is enabled during a time interval between a start timing of the frame data until an end timing of the header of the transmission unit that includes the high speed data and the output from the high speed scrambler 106 is enabled during the timing of the high speed data. Due to this, as shown in the uppermost portion of FIG. 6, the frame is obtained in which the frame data, the header of each transmission unit, and the low speed data are subjected to the scrambling process corresponding to the low speed bit rate A and the high speed data is subjected to the scrambling process corresponding to the high speed bit rate B.

Figure 7:
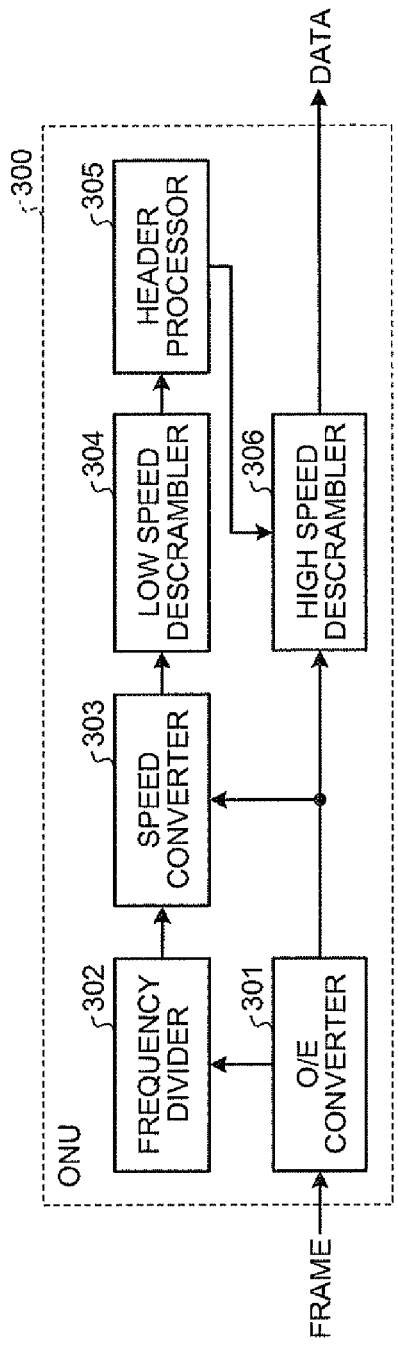
FIG. 7 is a block diagram of an ONU according to the first embodiment.

A structure of the ONU 300 according to the embodiment is explained with reference to FIG. 7. FIG. 7 is a block diagram of the ONU 300 corresponding to the high speed bit rate B according to the first embodiment. Because the structure of the ONU 300 corresponding to the low speed bit rate A is similar to the structure of the commonly used ONU, an explanation is omitted. The ONU 300 shown in FIG. 7 includes an optical/electrical (O/E) converter 301, a frequency divider 302, a speed converter 303, a low speed descrambler 304, a header processor 305, and a high speed descrambler 306.

The O/E converter 301 receives the frame via the optical fibers, converts the optical signals into the electrical signals, outputs the clock signals included in the frame to the frequency divider 302, and outputs signals other than the clock signals to the speed converter 303 and the high speed descrambler 306. Because the ONU 300 shown in FIG. 7 is the ONU 300 corresponding to the bit rate B, the clock signals included in the frame also correspond to the bit rate B.

The frequency divider 302 divides the clock signals included in the frame to retrieve the clock signals corresponding to the low speed bit rate A and outputs the retrieved clock signals to the speed converter 303.

The speed converter 303 uses the clock signals corresponding to the bit rate A to convert a signal speed of the frame to a speed equivalent to the bit rate A, and outputs the frame to the low speed descrambler 304.

The low speed descrambler 304 performs the descrambling process on the frame by using the clock corresponding to the low speed bit rate A. To be specific, the low speed descrambler 304 includes an internal structure that is similar to the internal structure of the low speed scrambler 105 of the OLT 100. The low speed descrambler 304 calculates an exclusive-OR of each bit of the frame and a descrambling bit that changes for each clock corresponding to the low speed bit rate A to obtain descramble data.

The header processor 305 retrieves the frame header and the header of each transmission unit from the descramble data that is obtained by the low speed descrambler 304, and notifies the high speed descrambler 306 of a position of the transmission unit that includes the high speed data addressed to the ONU 300 itself.

The high speed descrambler 306 uses the clock corresponding to the bit rate B to perform the descrambling process on the high speed data that is arranged at the position, in the frame, that is notified by the header processor 305. To be specific, the high speed descrambler 306 includes an internal structure that is similar to the internal structure of the high speed scrambler 106 of the OLT 100. The high speed descrambler 306 calculates an exclusive-OR of each bit of the high speed data and the descrambling bit that changes for each clock corresponding to the high speed bit rate B to obtain the data addressed to the ONU 300 itself.

In the first embodiment, a signal portion of the low speed bit rate A is subjected to the scrambling process by the low speed scrambler 105 and the signal portion of the high speed bit rate B is subjected to the scrambling process by the high speed scrambler 106. Further, the frame header and the header of each transmission unit are treated as the signal portion of the bit rate A and all the ONU 300 can confirm the content in common.

The ONU 300 corresponding to the bit rate B divides frequency of the clock signals that are included in the received signals to retrieve the clock signals corresponding to the bit rate A and converts the signal speed of the received frame to confirm the content of the frame header and the header of each transmission unit. Next, from the content of the header, the ONU 300 confirms the position of the transmission unit that includes the high speed data addressed to the ONU 300 itself and causes the high speed descrambler 306 to perform the descrambling process on the high speed data that is addressed to the ONU 300 itself. Due to this, the ONU 300 corresponding to the bit rate B can accurately retrieve the data addressed to the ONU 300 itself from the frame in which the bit rates are mixed.

The ONU 300 corresponding to the bit rate A uses the clock signals that are included in the received signals and that correspond to the bit rate A to perform the descrambling process, thus enabling to confirm the content of the frame header and the header of each transmission unit. Further, from the header of the transmission unit, the ONU 300 detects the position of the low speed data that is addressed to the ONU 300 itself (in other words, from the header, the ONU 300 detects the identification data of the ONU 300 itself), thus enabling to retrieve the data addressed to the ONU 300 itself.

According to the first embodiment, the OLT attaches, to all the data that are transmitted to each ONU, the header of the bit rate of the minimum speed among the bit rates corresponding to the multiple ONU that can receive the signals, generates the transmission units, performs a low speed scrambling process on the header and the low speed data using the clock corresponding to the bit rate of the minimum speed, and performs a high speed scrambling process on the high speed data using the clock corresponding to the bit rate of the high speed data. Due to this, even if the low speed data and the high speed data are mixed in a single frame, a destination address of the data can be identified from the header of the bit rate of the minimum speed in all the ONU. Thus, the signals of the different bit rates can be mixed and transmitted at a low cost.

Based on a salient feature of a second embodiment of the present invention, both the low speed scrambling process and the high speed scrambling process are performed on the combined data that includes the low speed data and the high speed data. Due to this, a device structure of the OLT is simplified.

Figure 8:
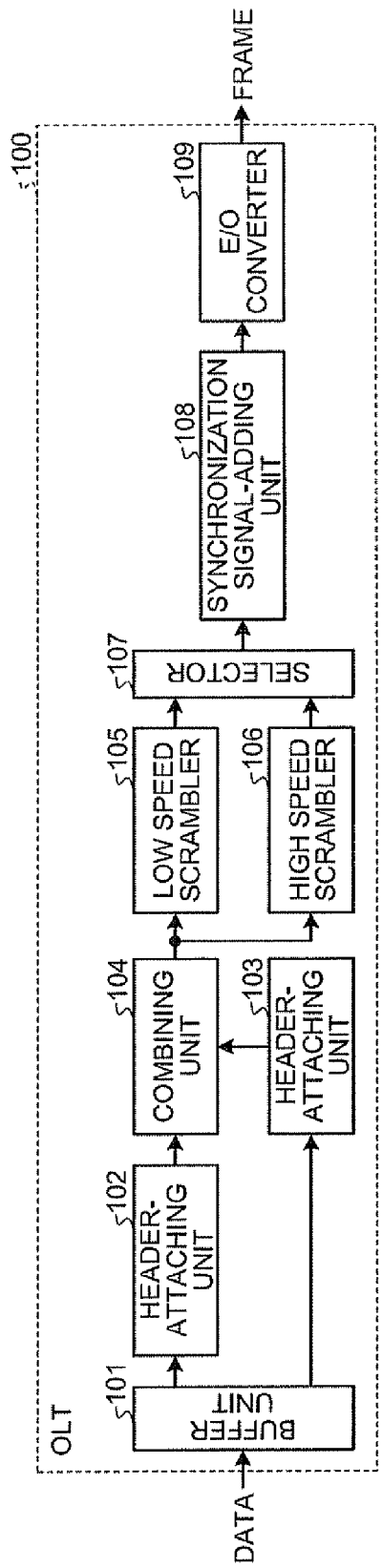
FIG. 8 is a block diagram of an OLT according to a second embodiment of the present invention.

FIG. 8 is a block diagram of the OLT 100 according to the second embodiment. The components, which are the same as the respective components shown in FIG. 2, are indicated by the same reference numerals and an explanation is omitted. The OLT 100 shown in FIG. 8 includes a high speed scrambler 121 instead of the high speed scrambler 106 of the OLT 100 that is shown in FIG. 2.

The high speed scrambler 121 uses the clock corresponding to the high speed bit rate B to perform the scrambling process on the combined data that is obtained by the combining unit 104. In other words, the high speed scrambler 121 calculates an exclusive-OR of each bit of the combined data and the scrambling bit that changes for each clock corresponding to the high speed bit rate B to obtain the scramble data. An internal structure of the high speed scrambler 121 is similar to the internal structure of the scramblers that are explained in the first embodiment (see FIG. 3).

In the second embodiment, after the combining unit 104 combines the frame header, the transmission unit that includes the low speed data, and the transmission unit that includes the high speed data to obtain the combined data, the combined data is subjected to the scrambling process by the low speed scrambler 105 and the high speed scrambler 121.

Due to this, the header-attaching unit 103 need not output only the high speed data of the bit rate B to the high speed scrambler 121. The header-attaching unit 103 can exercise simple control and output the same combined data to the low speed scrambler 105 and the high speed scrambler 121. In other words, compared to the first embodiment, in the second embodiment, an output line from the header-attaching unit 103 to the high speed scrambler 121 is not needed and the device structure of the OLT 100 can be simplified. Further, similarly as in the first embodiment, the selector 107 selects and outputs the output from the high speed scrambler 121 during the timing corresponding to the high speed data. Due to this, the final generated frame is similar to the frame in the first embodiment.

Figure 9:
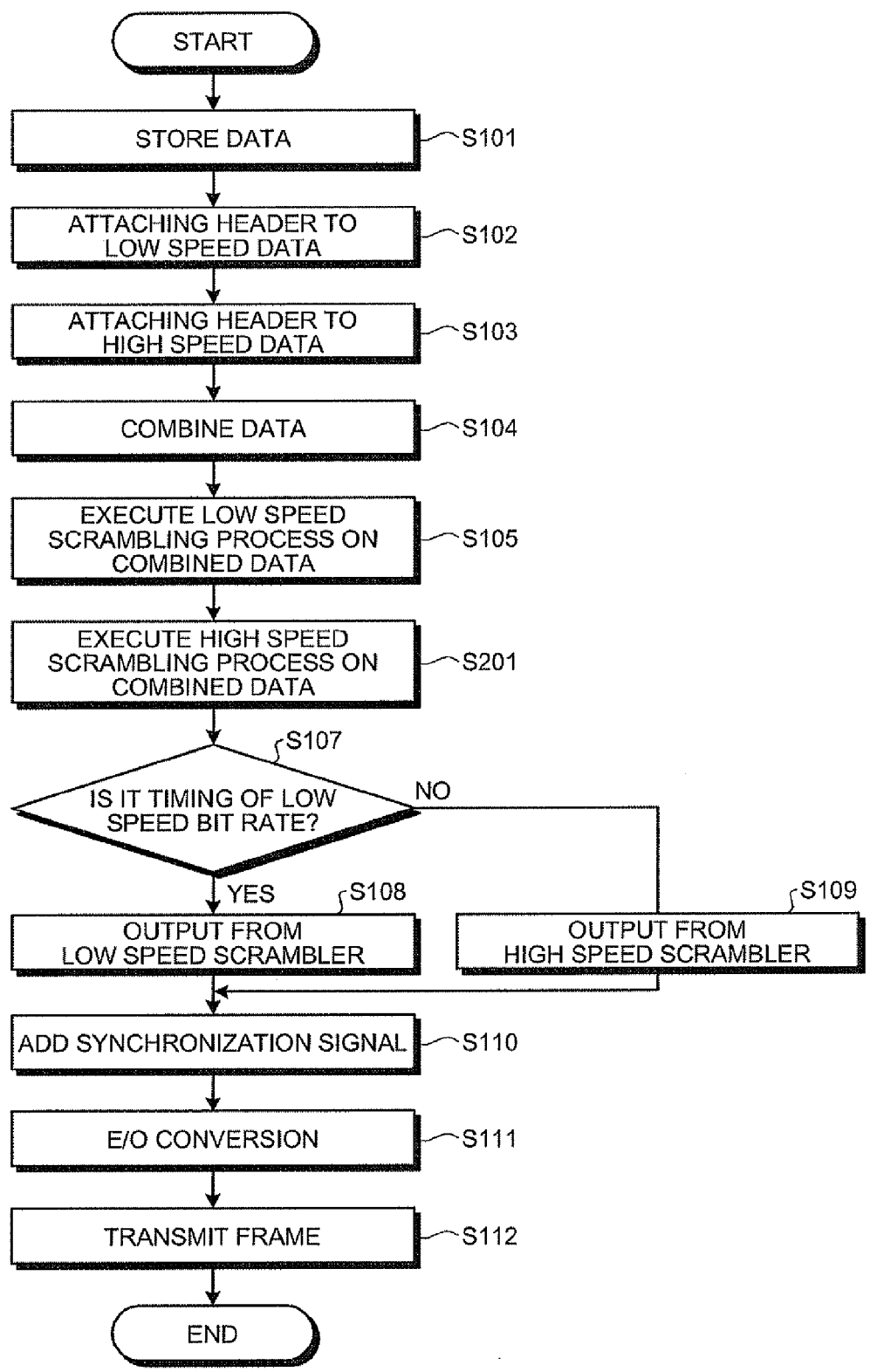
FIG. 9 is a flowchart of an operation of the OLT according to the second embodiment.

An operation of the OLT 100, which includes the structure mentioned earlier, is explained next with reference to a flow-chart shown in FIG. 9. Portions, which are the same as the respective portions shown in FIG. 4, are indicated by the same reference symbols and a detailed explanation is omitted.

First, the data addressed to the ONU 300 is input into the OLT 100 and is stored in the buffer unit 101 (step S101). Next, among the data that is stored in the buffer unit 101, the low speed data is output to the header-attaching unit 102 and the header is attached to the low speed data (step S102). The high speed data is output to the header-attaching unit 103 and the header is attached to the high speed data (step S103).

The transmission unit, which includes the high speed data that is generated by the header-attaching unit 103, is output to the combining unit 104. The combining unit 104 combines the transmission unit that includes low speed data with the transmission unit that includes the high speed data (step S104) and outputs the obtained combined data to the low speed scrambler 105 and the high speed scrambler 121.

Due to this, the combined data is input into both the low speed scrambler 105 and the high speed scrambler 121. The combined data is subjected to the scrambling process by the low speed scrambler 105 (step S105). Similarly, the combined data is subjected to the scrambling process by the high speed scrambler 121 (step S106).

In other words, as shown in FIG. 10, the header and the low speed data of the bit rate A and the high speed data of the bit rate B are input into the low speed scrambler 105 and subjected to the scrambling process using the clock corresponding to the bit rate A. Further, the header and the low speed data of the bit rate A and the high speed data of the bit rate B are also input into the high speed scrambler 121 and subjected to the scrambling process using the clock corresponding to the bit rate B. In the second embodiment, because the low speed scrambler 105 performs the scrambling process on the high speed data among the combined data and the high speed scrambler 121 performs the scrambling process on the low speed data among the combined data, the bit rate B of the high speed data being an integral multiple of the bit rate A is desirable. Further, although not shown in FIG. 10, the frame header, which stores therein the frame data of the entire frame, is first input into the low speed scrambler 105 and the high speed scrambler 121.

Thus, executing the scrambling process by using the low speed scrambler 105 and the high speed scrambler 121 scrambles the combined data and enables to curb interference between the signals that are being transmitted. Further, although the combined data is subjected to the scrambling process by both the low speed scrambler 105 and the high speed scrambler 121, for the high speed data, interference curbing effect is greater when the scramble data is transmitted by the high speed scrambler 121.

Due to this, in the predetermined frame structure, the selector 107 determines whether each timing, which enables to position the scramble data in the frame, is the timing for the signals of the low speed bit rate A (step S107). In other words, during the timing for the frame header, the header of the transmission unit, and the signals of the low speed data in the frame, the selector 107 selects and outputs the output from the low speed scrambler 105 (step S108). During the timing for the signals of the high speed data in the frame the selector 107 selects and outputs the output from the high speed scrambler 121 (step S109).

Next, the synchronization signal-adding unit 108 adds the synchronization signals of the predetermined pattern in the beginning of the output from the selector 107 to generate the frame (step S110). Because the synchronization signals are used at the time of establishing synchronization before the descrambling process in the receiver ONU 300, the synchronization signals are added in the beginning of the frame before performing the scrambling process. The frame thus generated is converted into the optical signals by the E/O converter 109 (step S111) and is transmitted to the multiple ONU 300 via the optical fibers (step S112).

Operation timings of the low speed scrambler 105 and the high speed scrambler 121 according to the second embodiment are specifically explained with reference to FIG. 11.

In the second embodiment, the OLT 100 transmits the frame in which the single or the multiple transmission units are arranged in continuation with the frame header that includes the synchronization signals in the head. It is assumed that the single frame includes the frame header, the transmission unit that includes the low speed data, and the transmission unit that includes the high speed data.

Figure 11:
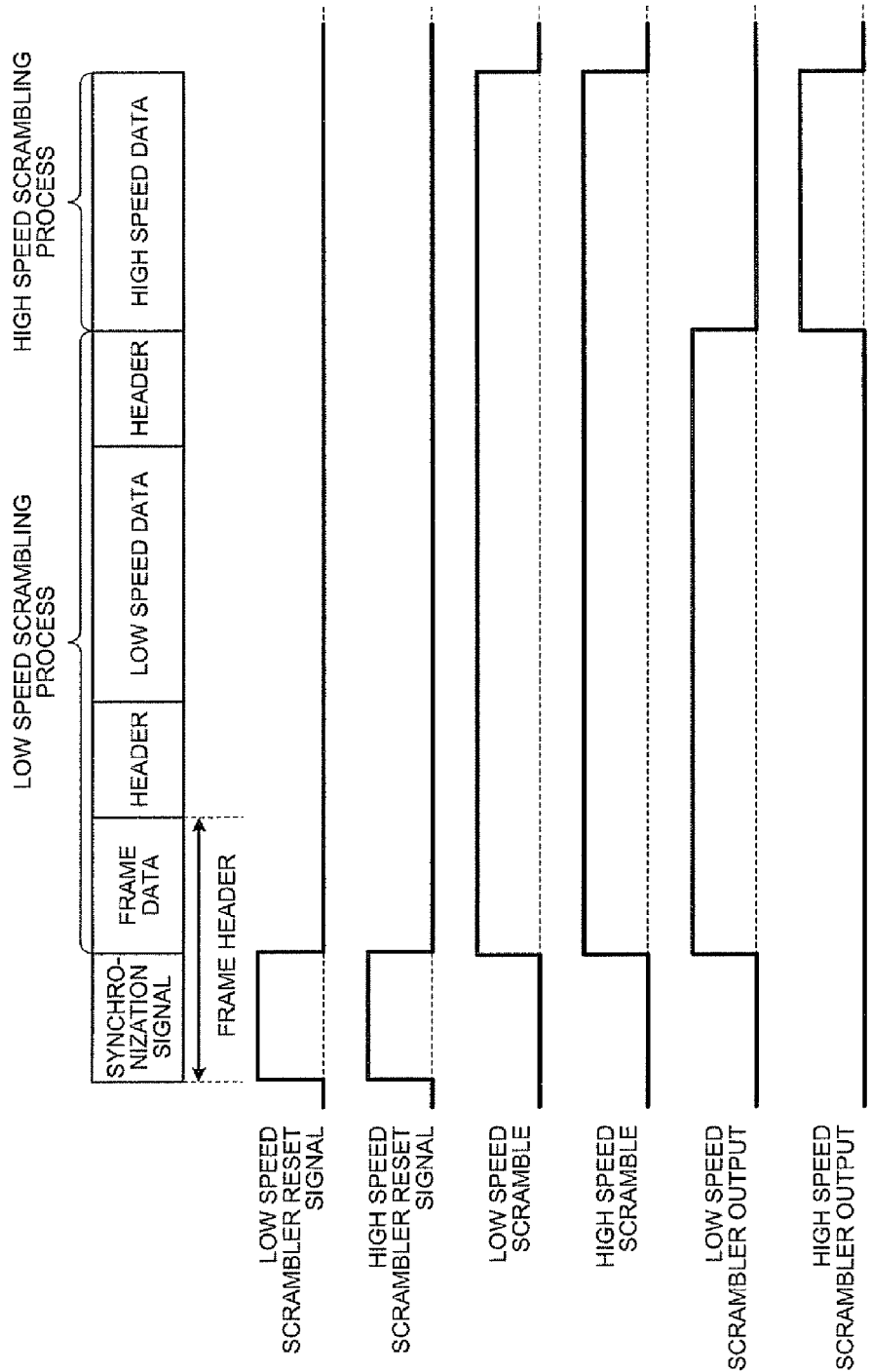
FIG. 11 is a schematic of an operation timing of a scrambler according to the second embodiment.

As shown in FIG. 11, during the timing of the synchronization signals in the beginning of the frame, the reset signals in both the low speed scrambler 105 and the high speed scrambler 121 enter enable status that indicates validity. Due to this, all the shift registers 401 and the end shift register 402 which are shown in FIG. 3 are initialized and store therein "1".

Next, similarly as in the first embodiment, the low speed scrambler 105 enters enable status and performs the scrambling process on the frame data of the bit rate A, the transmission unit that includes the low speed data, and the transmission unit that includes the high speed data by using the clock corresponding to the bit rate A. In the second embodiment, the high speed scrambler 121 enters enable status during the same timing as the timing of the low speed scrambler 105 and performs the scrambling process on the frame data of the bit rate A, the transmission unit that includes the low speed data, and the transmission unit that includes the high speed data by using the clock corresponding to the bit rate B.

Further, in the selector 107, the output from the low speed scrambler 105 is enabled during the time interval between the start timing of the frame data until the end timing of the header of the transmission unit that includes the high speed data and the output from the high speed scrambler 121 is enabled during the timing of the high speed data. Due to this, as shown in the uppermost portion of FIG. 11, the frame is obtained in which the frame data, the header of each transmission unit, and the low speed data are subjected to the scrambling process corresponding to the low speed bit rate A and the high speed data is subjected to the scrambling process corresponding to the high speed bit rate B.

According to the second embodiment, the OLT performs the low speed scrambling process and the high speed scrambling process on the combined data that is obtained by combining the transmission unit of the low speed with the transmission unit of the high speed. Further, according to a position in the frame, the OLT selects a result of the scrambling process for arranging in the frame. Thus, different scramblers perform the scrambling process on the same data, thereby enabling to simplify the device structure.

Based on a salient feature according to a third embodiment of the present invention, even if the frame includes the high speed data, the frame is subjected to the scrambling process using only the low speed scrambler. Thus, the device structure is further simplified.

Figure 12:
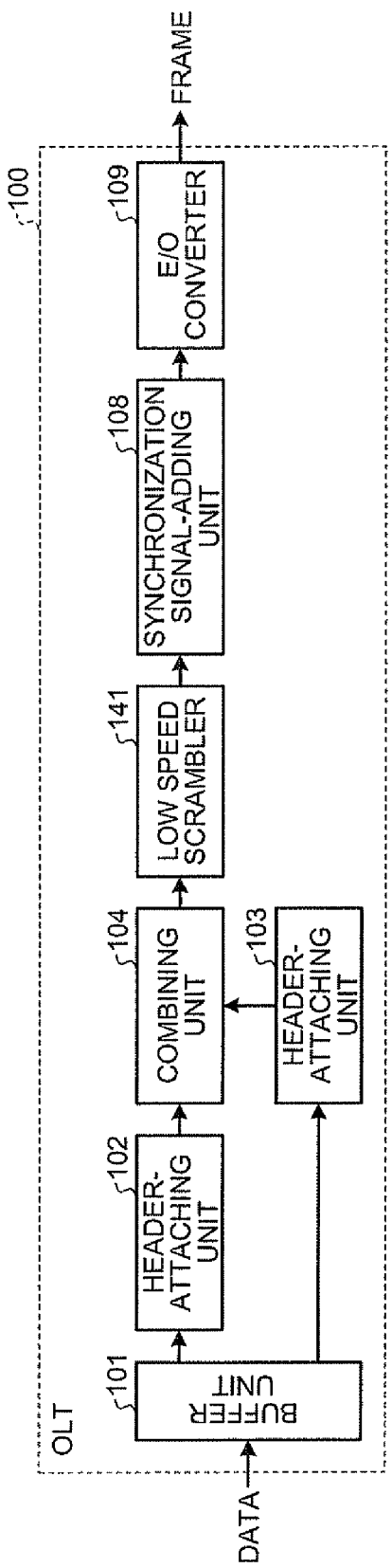
FIG. 12 is a block diagram of an OLT according to a third embodiment of the present invention.

FIG. 12 is a block diagram of the OLT 100 according to the third embodiment. Components, which are the same as the respective components shown in FIG. 2, are indicated by the same reference numerals and an explanation is omitted. The OLT 100 shown in FIG. 12 includes a low speed scrambler 141 instead of the low speed scrambler 105 of the OLT 100 shown in FIG. 2. Further, the high speed scrambler 106 and the selector 107 are omitted.

The low speed scrambler 141 performs the scrambling process on the combined data by using the clock corresponding to the low speed bit rate A. In other words, the low speed scrambler 141 calculates an exclusive-OR of each bit of the combined data and the scrambling bit that changes for each clock corresponding to the low speed bit rate A to obtain the scramble data. When performing the scrambling process, the low speed scrambler 141 uses the same scrambling bit for the multiple bits of the high speed data in the combined data. An internal structure of the low speed scrambler 141 is similar to the internal structure of the scramblers that are explained in the first embodiment (see FIG. 3).

The low speed scrambler 141 directly outputs the scramble data to the synchronization signal-adding unit 108. Accordingly, in the third embodiment, the entire combined data is subjected to the low speed scrambling process, the synchronization signals are added in the beginning of the combined data, and the frame is generated. The high speed data is also subjected to the low speed scrambling process and transmitted.

In the third embodiment, the high speed data of the bit rate B is also subjected to the scrambling process using the clock corresponding to the bit rate A and transmitted to the ONU 300. Thus, the multiple bits in the high speed data in the frame are subjected to the scrambling process by using the same scrambling bit.

Figure 13:
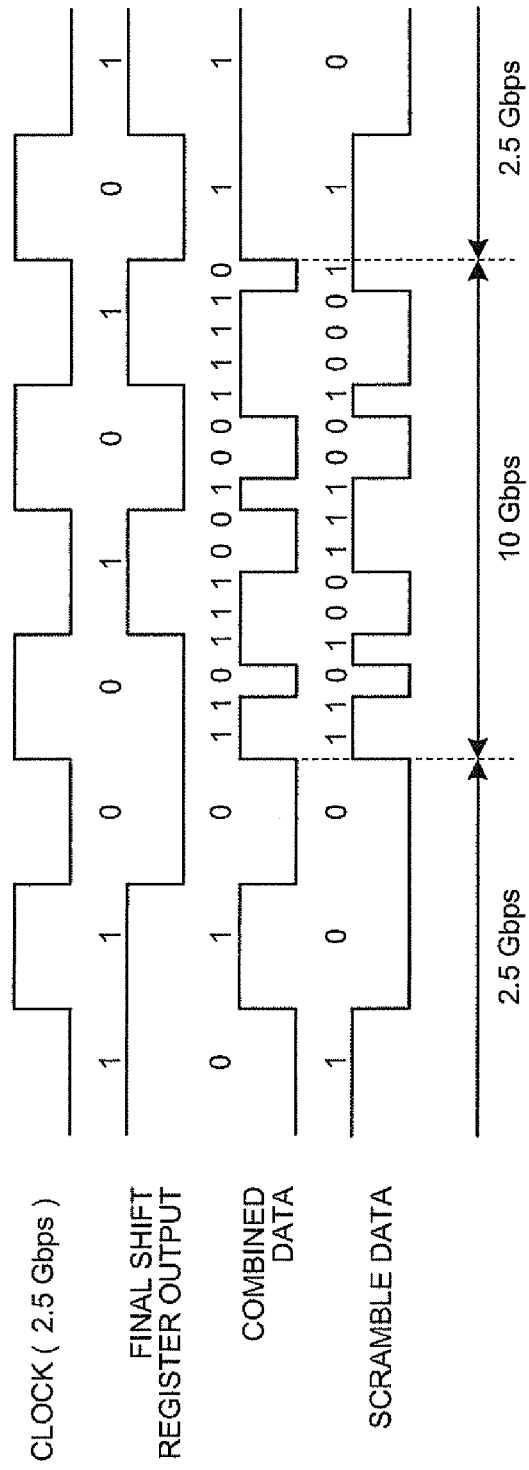
FIG. 13 is a schematic for explaining a scrambling process according to the third embodiment.

To be specific, as shown in FIG. 13, upon assuming that the bit rate A is 2.5 gigabit per second (Gbps) and the bit rate B is 10 Gbps, the clock inside the low speed scrambler 141 is 2.5 Gbps. Due to this, as shown in FIG. 13, the value of the single bit, which is output from the end shift register 402 shown in FIG. 3, also changes during a cycle corresponding to 2.5 Gbps and "110010101" is sequentially output.

As shown in FIG. 13, the header and the low speed data of 2.5 Gbps and the high speed data of 10 Gbps are mixed in the combined data. Because a bit rate of the high speed data is four times the bit rate of the low speed data, four bits of the high speed data are included within a single cycle of the clock. Thus, in the third embodiment, because the high speed data is also subjected to the scrambling process corresponding to the low speed bit rate A, the bit rate B needs to be an integral multiple of the bit rate A.

The low speed scrambler 141 calculates an exclusive-OR of the bits of the combined data and the bits of an end shift register output that changes during the clock corresponding to 2.5 Gbps to obtain the scramble data. However, for the high speed data in the combined data, the low speed scrambler 141 calculates an exclusive-OR of the bits of the same end shift register output. Further, for the header and the low speed data in the combined data, the low speed scrambler 141 calculates an exclusive-OR of a single bit and a single bit of the end shift register output. As shown in FIG. 13, in the scramble data thus obtained, the bit rate of 2.5 Gbps portion in the combined data is 2.5 Gbps and the bit rate of 10 Gbps portion in the combined data is 10 Gbps.

Figure 14:
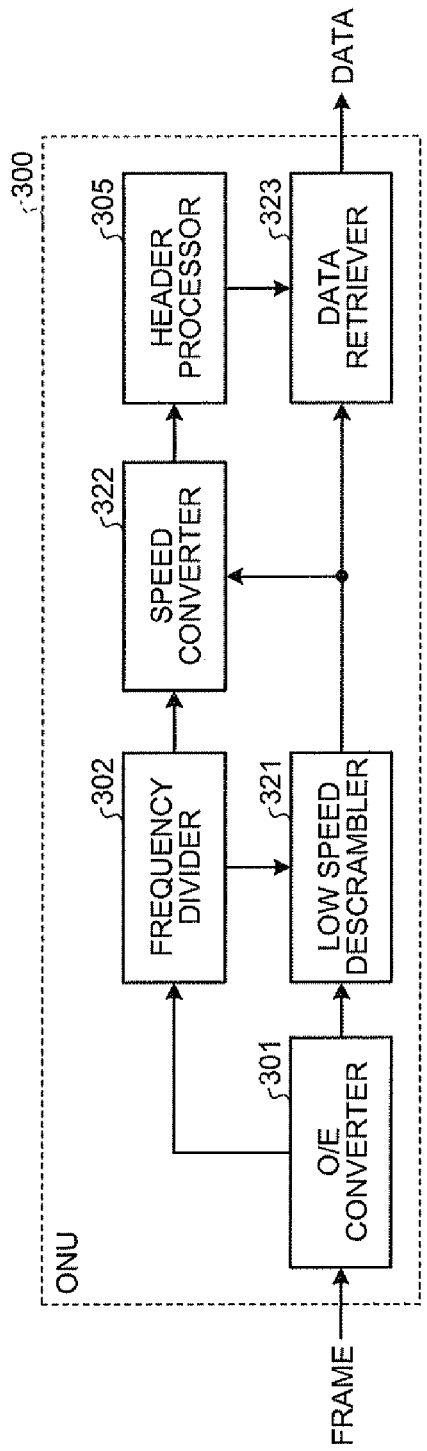
FIG. 14 is a block diagram of an ONU according to the third embodiment.

A structure of the ONU 300 according to the third embodiment is explained with reference to FIG. 14. FIG. 14 is a block diagram of the ONU 300 corresponding to the high speed bit rate B according to the third embodiment. Components, which are the same as the respective components shown in FIG. 7, are indicated by the same reference numerals and an explanation is omitted. The ONU 300 shown in FIG. 14 includes the O/E converter 301, the frequency divider 302, a low speed descrambler 321, a speed converter 322, the header processor 305, and a data retriever 323.

The low speed descrambler 321 uses the clock signals corresponding to the bit rate A that are obtained by the frequency divider 302 and performs the descrambling process on the entire frame. Next, the low speed descrambler 321 outputs to the speed converter 322 and the data retriever 323, the descramble data that is obtained by performing the descrambling process.

The speed converter 322 uses the clock signals corresponding to the bit rate A to convert the signal speed of the descramble data into a speed equivalent to the bit rate A and outputs the descramble data to the header processor 305. Accordingly, the header processor 305 according to the third embodiment retrieves the header of the transmission unit from the descramble data and notifies the data retriever 323 of a position of the transmission unit that includes the high speed data addressed to the ONU 300 itself.

The data retriever 323 retrieves the high speed data, in the descramble data, that is arranged at the position that is notified from the header processor 305. In the third embodiment, because the descrambling process of the high speed data is also completed by the low speed descrambler 321, the data retriever 323 can simply retrieve the high speed data from the portion that corresponds to the high speed data.

In the third embodiment, the low speed scrambler 141 performs the scrambling process on the signals of the low speed bit rate A and the signals of the high speed bit rate B. Further, the frame header and the header of each transmission unit are included in the signals of the bit rate A and all the ONU 300 can confirm the content in common.

Thus, the ONU 300 corresponding to the bit rate B divides a frequency of the clock signals included in the received signals, retrieves the clock signals corresponding to the bit rate A, uses the clock corresponding to the bit rate A to perform the descrambling process on the entire frame, and converts the signal speed of the descramble data to confirm the content of the frame header and the header of each transmission unit. Next, from the content of the header, the ONU 300 confirms the position of the transmission unit that includes the high speed data addressed to the ONU 300 itself and causes the data retriever 323 to retrieve the high speed data addressed to the ONU 300 itself. Due to this, the ONU 300 corresponding to the bit rate B can accurately retrieve the data addressed to the ONU 300 itself from the frame in which the bit rates are mixed.

The ONU 300 corresponding to the bit rate A uses the clock signals corresponding to the bit rate A that are included in the received signals to perform the descrambling process, thus enabling to confirm the content of the frame header and the header of each transmission unit. Next, the ONU 300 detects from the header of the transmission unit, the position of the low speed data (in other words, detects the identification data of the ONU 300 itself from the header) that is addressed to the ONU 300 itself, thus enabling to retrieve the data that is addressed to the ONU 300 itself.

Thus, according to the third embodiment, the OLT performs the low speed scrambling process on the entire frame in which the low speed data and the high speed data are mixed and transmits the frame. Due to this, multiple scramblers having different speeds need not be included in the OLT and the device structure can be simplified further.

Based on a salient feature according to a fourth embodiment of the present invention, a known synchronization-preserving pattern is inserted during a predetermined cycle into the high speed data in the frame and the ONU corresponding to the low speed data can use the high speed data to protect synchronism.

Figure 15:
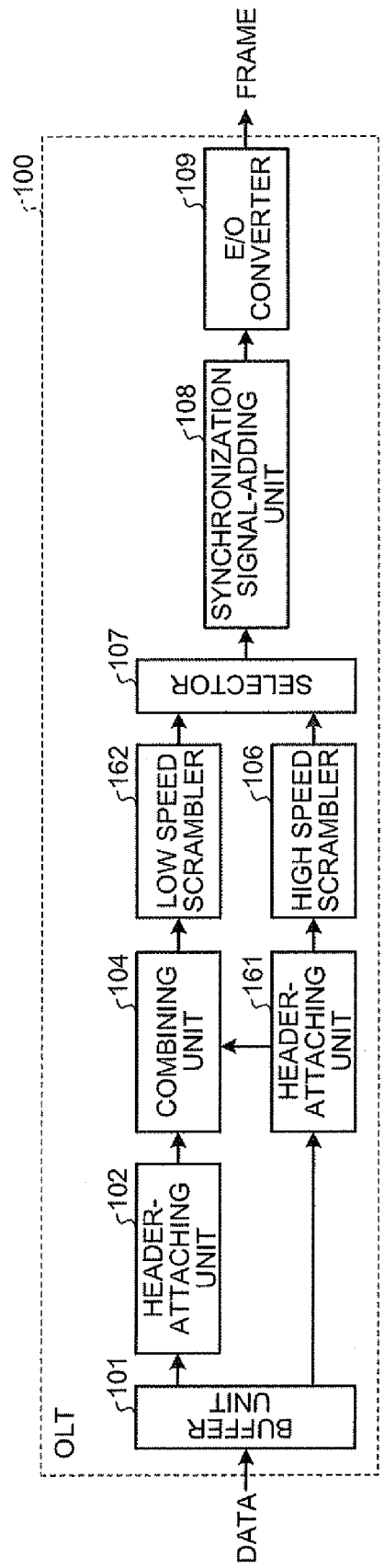
FIG. 15 is a block diagram of an OLT according to a fourth embodiment of the present invention.

FIG. 15 is a block diagram of the OLT 100 according to the fourth embodiment. Components, which are the same as the respective components shown in FIG. 2, are indicated by the same reference numerals and an explanation is omitted. The OLT 100 shown in FIG. 15 includes a header-attaching unit 161 and a low speed scrambler 162 instead of the header-attaching unit 103 and the low speed scrambler 105 respectively that are shown in FIG. 2.

Among the data that is stored in the buffer unit 101, the header-attaching unit 161 attaches the header of the bit rate A to the data of the high speed bit rate B (high speed data) and inserts the known synchronization-preserving pattern during the predetermined cycle to generate the transmission frame. The synchronization-preserving pattern is a bit pattern, of the bit rate A, that is prior stored by the ONU 300 inside the optical transmission system. By confirming the position of the synchronization-preserving pattern, the ONU 300 can protect the established synchronism.

The low speed scrambler 162 performs the scrambling process on the combined data by using the clock corresponding to the low speed bit rate A. In other words, the low speed scrambler 162 calculates an exclusive-OR of each bit of the combined data and the scrambling bit that changes for each clock corresponding to the low speed bit rate A to obtain the scramble data. When performing the scrambling process, the low speed scrambler 162 does not perform the scrambling process on the bit of the synchronization-preserving pattern and outputs the synchronization-preserving pattern before the scrambling process.

Figure 16:
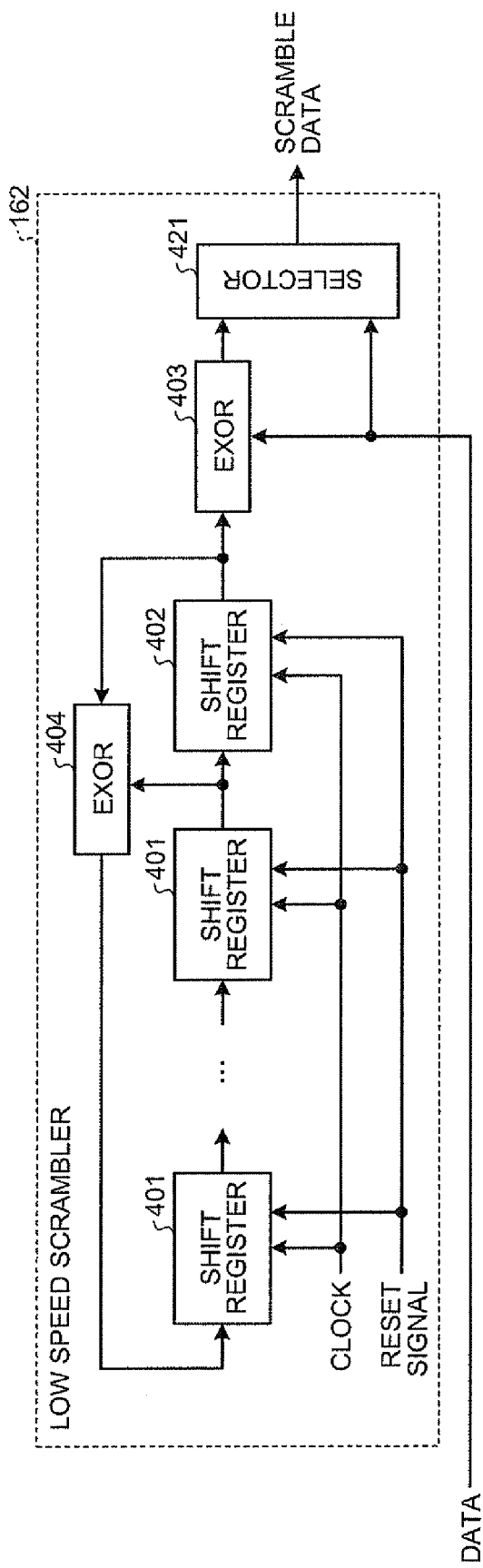
FIG. 16 is a block diagram of a low speed scrambler according to the fourth embodiment.

To be specific, the low speed scrambler 162 according to the fourth embodiment includes an internal structure that is shown in FIG. 16. Components, which are the same as the respective components shown in FIG. 3, are indicated by the same reference numerals and an explanation is omitted.

During a timing of a portion other than the synchronization-preserving pattern of the combined data, a selector 421 selects and outputs the output from the EXOR circuit 403. During a timing of the synchronization-preserving pattern, the selector 421 selects and outputs the original combined data. In other words, only for the synchronization-preserving pattern in the combined data, the selector 421 outputs data before the scrambling process.

In the fourth embodiment, during the timing of the high speed data, the selector 107 selects the output from the high speed scrambler 106. During the timing of the other headers or the synchronization-preserving pattern, the selector 107 selects the output from the low speed scrambler 162. Thus, the synchronization-preserving pattern, which is not subjected to the scrambling process during the predetermined cycle, is inserted into the high speed data of the frame that is generated due to addition of the synchronization signals by the synchronization signal-adding unit 108.

Because the synchronization-preserving pattern is not subjected to the scrambling process, the synchronization-preserving pattern can be used before the descrambling process in the ONU 300. Further, because the synchronization-preserving pattern of the bit rate A is inserted into the high speed data during the predetermined cycle, the ONU 300 corresponding to the bit rate A can protect the synchronism by using the high speed data in the frame. Due to this, synchronism displacement in the ONU 300 corresponding to the bit rate A can be prevented.

Further, because the ONU 300 corresponding to the bit rate B can obtain the clock signals corresponding to the bit rate A by dividing a frequency, the ONU 300 can protect the synchronism by using the synchronization-preserving pattern. Further, the ONU corresponding to the bit rate B can also protect the synchronism by using the known pattern that is included in the high speed data of the bit rate B.

Thus, according to the fourth embodiment, the OLT inserts into the high speed data and transmits, the synchronization-preserving pattern, of the low speed bit rate, that is not subjected to the scrambling process. Due to this, the ONU corresponding to the low speed bit rate can protect the synchronism by using the high speed data. Thus, synchronism displacement or erroneous synchronism can be prevented.

In the embodiments explained earlier, all the multiple ONU 300 are corresponding to the bit rate A or to the bit rate B. However, the multiple ONU can also correspond to any one of three or more types of bit rates. When the ONU correspond to any one of the three or more types of bit rates, the bit rate of the header in the transmission unit can be matched with the bit rate of the lowest speed among the three or more types of bit rates. Further, scramblers, which correspond to three or more types of the bit rates, can also be included in the OLT 100.

The fourth embodiment mentioned earlier can also be combined with the second or the third embodiment. In other words, the synchronization-preserving pattern of the low speed bit rate can be inserted into the high speed data when the entire combined data is subjected to the scrambling process using both the low speed scrambler and the high speed scrambler or even when the entire combined data is subjected to the scrambling process using only the low speed scrambler.

According to a structure mentioned earlier, regardless of a bit rate of data, a header of a bit rate of the minimum speed is attached, and a scrambling process is performed on the data and the header by using clocks according to the respective bit rates. Due to this, the scrambling process can be performed on the respective data having different bit rates by using the appropriate clocks. Further, from the header of the bit rate of the minimum speed, a destination address of the data can be reliably identified at a receiving side. In other words, the scrambling process and transmission of high speed data and low speed data can be performed without changing an existing network form and signals of differing bit rates can be mixed and transmitted at a low cost.

According to the structure mentioned earlier, because the same signals are output to a plurality of scramblers, a device structure can be simplified.

According to the structure mentioned earlier, a frame, which includes the signals that are positioned after the scrambling process, is generated according to the bit rates before the scrambling process. Due to this, the frame, which includes the positioned signals that are obtained by performing the appropriate scrambling process on the header and the data inside the frame, can be transmitted.

According to the structure mentioned earlier, synchronization signals, which are not subjected to the scrambling process, are added in a beginning of the frame. Due to this, frame synchronization can be established before executing a descrambling process at the receiving side.

According to the structure mentioned earlier, the scrambling process is performed using a plurality of shift registers and an exclusive-OR-operation circuit. Due to this, the clocks corresponding to the bit rates can be reflected in the scrambling process. Further, adjusting positions of the shift registers and the exclusive-OR-operation circuit enables to perform the scrambling process that uses a random generating polynomial.

According to the structure mentioned earlier, a synchronization-preserving pattern of the low speed bit rate is also added to the data of the high speed bit rate without performing the scrambling process. Due to this, the receiving side, which corresponds to the low speed bit rate, can protect synchronism using the data of the high speed bit rate. Thus, synchronism displacement or erroneous synchronism can be prevented.

According to the structure mentioned earlier, the header of the bit rate of the minimum speed is attached regardless of the bit rates of the data, the data and the header having different bit rates are combined, and the scrambling process is performed using the clock corresponding to the bit rate of the minimum speed. Due to this, only one scrambler needs to be used and the device structure can be further simplified. Further, the receiving side can reliably perform the descrambling process regardless of the corresponding bit rate.

According to the structure mentioned earlier, the synchronization signals, which are not subjected to the scrambling process, are added in the beginning of the signals after the scrambling process. Due to this, synchronism can be established at the receiving side before executing the descrambling process.

According to the structure mentioned earlier, the synchronization-preserving pattern of the low speed bit rate is also added to the data of the high speed bit rate without performing the scrambling process. Due to this, the receiving side, which corresponds to the low speed bit rate, can protect synchronism using the data of the high speed bit rate. Thus, synchronism displacement or erroneous synchronism can be prevented.

According to the structure mentioned earlier, low speed clock signals corresponding to the bit rate of the minimum speed are retrieved using frequency division. After executing the descrambling process of the header using the low speed clock signals, the header is referred to perform, using the original clock signals, the descrambling process on the data that is addressed to the optical transmission device itself. Due to this, if the header, which is attached to all the data, is the bit rate of the minimum speed, the data addressed to the optical transmission device itself can be specified from the header. Thus, the data addressed to the optical transmission device itself can be easily subjected to the descrambling process.

According to the method mentioned earlier, the low speed clock signals corresponding to the bit rate of the minimum speed are retrieved using frequency division. After executing the descrambling process of the header using the low speed clock signals, the header is referred to perform, using the original clock signals, the descrambling process. Due to this, if the header, which is attached to all the data, is the bit rate of the minimum speed, the destination address of the data can be identified from the header and the data can be easily subjected to the descrambling process in the regular destination.

According to an embodiment of the present invention, signals of different bit rates can be mixed and transmitted at a low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission device that transmits data to a plurality of destination addresses, comprising:
   a processor that executes a process including:
      first attaching a header of a first bit rate to data of the first bit rate, the header of the first bit rate including identification data for identifying a destination address of the data of the first bit rate;
      second attaching the header of the first bit rate to data of a second bit rate greater than the first bit rate, the header of the first bit rate including identification data for identifying a destination address of the data of the second bit rate; and
      combining signals that are obtained at the first attaching and the second attaching to obtain combined data;
   a scrambler that performs a scrambling process, by using a clock corresponding to the first bit rate, on the combined data obtained by the processor; and
   a transmitter that transmits a signal obtained from the scrambling process by the scrambler.

2. The optical transmission device according to claim 1, wherein the transmitter adds, in a beginning of the signal obtained from the scrambling process by the scrambler, a synchronization signal of a known pattern.

3. The optical transmission device according to claim 1, wherein the scrambler includes
   a plurality of shift registers that shift, for each clock corresponding to the first bit rate, a single bit value, and
   an exclusive-OR-operation circuit that calculates, for each clock corresponding to the first bit rate, an exclusive-OR of the single bit value that is shifted from any one of the plurality of shift registers and a bit of the combined data.

4. The optical transmission device according to claim 1, wherein
   the process further includes adding a synchronization-preserving pattern of the first bit rate to the data of the second bit rate, and
   the scrambler does not perform the scrambling process on the synchronization-preserving pattern.

5. A scrambling method for an optical transmission device that transmits data to a plurality of destination addresses, comprising:
   attaching a header of a first bit rate to data of the first bit rate, the header of the first bit rate including identification data for identifying a destination address of the data of the first bit rate;
   attaching the header of the first bit rate to data of a second bit rate greater than the first bit rate, the header of the first bit rate including identification data for identifying a destination address of the data of the second bit rate;
   combining signals that are obtained by the attaching to the data of the first bit rate and the second bit rate to obtain combined data;
   performing a scrambling process, by using a clock corresponding to the first bit rate, on the combined data; and
   transmitting a signal obtained from the scrambling process.

* * * * *